United States Patent
Lembke

[11] Patent Number: 6,050,782
[45] Date of Patent: Apr. 18, 2000

[54] MAGNETICALLY SUSPENDED HIGH VELOCITY VACUUM PUMP

[75] Inventor: Torbjörn Lembke, Uppsala, Sweden

[73] Assignee: Magnetal AB, Uppsala, Sweden

[21] Appl. No.: 09/013,601

[22] Filed: Jan. 26, 1998

[51] Int. Cl.[7] .................................................. F04B 23/08
[52] U.S. Cl. ...................... 417/205; 417/354; 417/423.4; 415/90; 415/103
[58] Field of Search ................... 417/423.12, 423.4, 417/244, 353, 354, 203, 205; 415/90, 103, 229

[56] References Cited

U.S. PATENT DOCUMENTS

| | | | |
|---|---|---|---|
| 3,399,827 | 9/1968 | Schwartzman | 417/406 |
| 3,779,618 | 12/1973 | Soglia et al. | |
| 3,811,740 | 5/1974 | Sacerdoti et al. | |
| 3,969,039 | 7/1976 | Shoulders | 417/244 |
| 4,295,803 | 10/1981 | Barthelmess | 417/423.12 |
| 5,106,273 | 4/1992 | Lemarquand et al. | 417/356 |
| 5,250,865 | 10/1993 | Meeks | 310/90.5 |
| 5,470,208 | 11/1995 | Kletschka | 417/356 |
| 5,501,582 | 3/1996 | Gautier et al. | 417/420 |

FOREIGN PATENT DOCUMENTS 95103450  5/1995  European Pat. Off. .
9203090   4/1994  Sweden .

OTHER PUBLICATIONS

Magnetic Suspension and Propulsion Systems for High–Speed Transportation, P.L. Richards and M. Tinkham, J. Appl. Phys. vol. 43, No. 6, Jun. 1972, pp. 2680–2690.

*Primary Examiner*—Timothy S. Thorpe
*Assistant Examiner*—David J Torrente
*Attorney, Agent, or Firm*—Young & Thompson

[57] ABSTRACT

High velocity vacuum pump, such as turbomolecular pump, drag pump, centrifugal pump or the like, comprising a stator (10) and a rotor (18,43,53), which is axially and radially suspended with respect to the stator (10) by magnetic bearings (27). The vacuum pump may comprise two at the same rotor provided, parallelly acting pump portions, each one comprising two pumping steps. The rotor may be cylindrical and rotates around an inner stator shaft and within an outer stator portion. In that way, one pumping step (22) is formed between the inner stator shaft and the rotor and another pumping step (24) between the outer stator portion (10) and the rotor. The magnet bearing comprises at least one rotation symmetric magnet (27) and is disposed to give rise to a rotation symmetric magnetic field which is centered around the rotational axis. When and only when the rotor tends to leave the predetermined path, the magnetic field generates induced eddy currents in the rotor, which give rise to restoring stabilizing forces.

9 Claims, 4 Drawing Sheets

MAGNETICALLY SUSPENDED HIGH VELOCITY VACUUM PUMP

TECHNICAL FIELD

The invention relates generally to a high velocity vacuum pump. By vacuum pumps is here understood turbo molecular pumps, drag pumps, centrifugal pumps and similar pumps operating at high rotational speed, and combinations thereof.

PRIOR ART

High velocity vacuum pumps are used today in many high vacuum applications, when a high vacuum of best quality as well as when relatively large amounts of gas is intended to be pumped away. Turbo molecular pumps operates according to the principle that fast movable solid sections transfer a linear momentum to substances in gas phase which come in their path. The average velocity of the gas particles can in this manner be directed out from the volume which is requested to be evacuated. Drag pumps normally operate at a higher pressures and force, by means of friction against a rotating wall, gas into helical grooves. Different types of pumps can also be combined in several steps to give a higher compression. Common for all of these types is that they demand extremely fast rotating parts.

It is also essential for the operation of such pumps that the distance between rotating and static parts is very small to reduce the back streaming of gas as far as possible, rather less than the mean free path for the gas molecules. Concerning most turbo molecular pumps, the pressure ratio varies exponentially with the rotational speed of the rotating parts, and the pumping speed varies linearly. Therefore it is of great importance to be able to work with as high rotational speed as possible. This leads to that the suspension of the rotating parts becomes very conclusive. From solely having used mechanical bearings, one has lately started to use different types of magnetic bearings, to avoid the disadvantages associated with mechanical bearings, wear, lubrication and vibrations.

In high velocity vacuum pumps according to the state of the art, the rotor normally is formed by a solid shaft, which preferably is suspended at its ends. A disadvantage with such an arrangement is that if the pumps should obtain a certain compression ratio, they tend to be rather long. Since the shaft is intended to be rotated by very high velocities, the balancing of the shaft with its rotor blades, helical grooves or similar accessories very important. The longer shaft, the more ductile shaft and the balancing becomes more difficult. A known method for increasing the total compression ratio is to use a combined pump type, where the part closest to the high vacuum side is formed as a turbomolecular pump and the part closest to the forevacuum end is formed as a drag pump. In this manner a high vacuum can be maintained, but with simpler forevacuum system. Even such systems require long shafts, which besides the above mentioned disadvantages also makes the pump heavy and ungainly. A disadvantage with long shafts is, besides the high weight and that the pumps becomes bulky, that the critical number of revolutions for the shaft tends to be rather low, which limits the useful rotational speed for the pump.

In high velocity vacuum pumps according to the state of the art it is furthermore normal that at least one bearing is placed within the high vacuum volume. If the bearing is of a mechanical type, there will arise problems with lubricating the bearing without destroying the high vacuum. If the bearing is a contact free magnetic suspension, no lubrication is indeed not needed, but on the other hand are most magnetic materials somewhat porous and may thereby give rise to degassing problems.

The most common pump type is connected to the volume which is intended to be evacuated at one of its ends and is connected to a forevacuum pump by the other end. The pressure difference under operation between the volumes at the ends of the shaft results in that a constant axially directed force is applied over the pump. The shaft is thus pushed in towards the high vacuum side, and this force has to be supported while it is suspended axially, which normally is made at its high vacuum side. This is a great drawback, in particular during venting of pumps in operation, when the forces may be very high.

Magnet bearings of different kinds have more and more started to replace conventional bearings in connection with high velocity vacuum pumps. Generally, so called active magnet bearings, i.e. electronically regulated bearings, are used. Occasionally, so called passive bearings, where the force usually is constituted by repulsion between oppositely directed magnets, are used. The latter may not be made totally stable, but are often used together with a stabilising ball bearing, which then reduces their field of application. The advantage with these systems is the lack of regulating systems and a low price.

The idea of using permanent magnets for a totally stable bearing, without need of either regulating system or ball bearings, can be realised by letting the magnets induce stabilising eddy currents in an electrically conducting material at the rotor. According to Lenz'law, such currents are always directed so as to give an oppositely directed, and thus repellent and stabilising, magnetic field. The great disadvantage with such bearings, using the so called electrodynamic repulsion, has been that the bearing generates very much heat, i.e. given rise to unacceptably high energy losses. Furthermore, the heat is difficult to cool away in high velocity vacuum pumps.

The discovery of "the null flux scheme" (see e.g. "Magnetic suspension . . . ", Journal of Applied Physics, Vol. 43, No 6, June 1972 by P. L. Richards and M. Tinkham) made that the losses could be reduced and this suspension method was taken seriously. The theory is founded on that unnecessary heat generation due to resistive losses can be compensated away by means of two oppositely directed magnets, used to form an area with a weak magnetic field, in which the electrically conductive material is brought to be floated. Eddy current bearings according to the state of the art are all founded on "the null flux scheme" and are present in a number of designs. Lembke suggests in the Swedish patent application 9203090-7 to use the bearing for rotating shafts, which also is mentioned in the patents U.S. Pat. No. 3,779,618 in the names of Soglia et al and U.S. Pat. No. 3,811,740 in the names of Sacerdoti et al. In the European patent application 95103450.3 a turbomolecular pump is described which is based on eddy current bearings. "The null flux scheme" offers the possibility to achieve infinitely small losses, presumed that the electrically conductive material is infinitely thin and that the magnets are infinitely strong. Furthermore, the speed has to be infinitely high. The practical limitations are obvious. Despite that the energy losses have been reduced significantly are the losses still too high to enable a commercial application of the bearings. Even if the bearings suggested by Lembke by experimental trials have been proved to be proportionally good, especially considering axial suspension, radial bearings of this type nevertheless still result in problems. For one thing because the thermoexpansion of the rotor has appeared to influence the losses considerably, since the rotor no longer is able to centre exactly between the magnets.

The basic reason for the disadvantages with magnetic bearings in high velocity vacuum pumps according to the state of the art is that the area where the field has "null flux", i.e. lacks any normal component, is infinitely thin by it self, why only an infinitely thin plate can be used. If the plate exhibits a thickness, the surface layers will be exposed to a fluctuating magnetic field when the plate passes by the magnets, whereby unnecessary eddy currents arise. The demand on the rotating plate to be thin is a drawback upon use in a high velocity vacuum pump. Since the rotational speed in such a pump may amount to hundred of thousand revolutions per minute, a relatively stable construction is needed for the rotating parts. The complex of problems concerning the thermo-expansion of the rotor also creates problems, since an efficient cooling is difficult to realise in a vacuum pump of this type.

These bearings according to the state of the art all use one additional method for reducing the losses, viz. to let all static loads, such as inherent weight etc., be carried by a separate magnetic relieving device in the form of e.g. an attracting permanent magnet. Then, no additional eddy currents are needed to give rise to this force, the rotor may centre in the middle between the magnets, where the losses are minimal.

In connection with the use of magnetic bearings in high velocity vacuum pumps, there are some additional disadvantages. If the magnetic bearings by some reason stops to operate, there are in many systems according to the state of the art so called emergency bearings, by which the rotating parts may rotate during shorter periods, e.g. during retardation at an emergency stop. When the magnet bearings by some reason stop to operate, the shaft is displaced from its intended position and gets into contact with the emergency bearings. This contact has to be established long before any other parts on the rotor comes into contact with other static parts in the pump, e.g. before the turbine blades of the rotor gets into contact with the turbine blades of the stator in a turbomolecular pump. Since such a displacement also often give rise to different bending forces on the shaft and since the emergency bearings usually are placed right out at the ends of the shafts, the margins in the emergency bearings have to be very small. The clearance margin between the emergency bearing and the shaft during normal operation has to be kept two to three times less than the narrowest slit in the pump itself, e.g. between the turbine blades in a turbomolecular pump. This is a great drawback since the slits in the operating parts of the pump is requested to be as small as possible to prevent backstreaming of the gas.

Another disadvantage with high velocity vacuum pumps according to the state of the art is that it generally is impossible for a user to perform change of bearings or other advanced maintenance without access to advanced special tools. This means that service normally can not be performed at site, but the pump unit has to be disconnected and sent away to the manufacturer or authorised service personnel for such measures. Subsequently, the user is caused long inactivity periods and costs in connection with maintenance.

SUMMARY OF THE INVENTION

The object of the present invention is to provide a high velocity vacuum pump which do not present the above described disadvantages. Such a vacuum pump is smaller and lighter, and, accordingly, requires less energy and is faster to accelerate, has a higher critical number of revolutions and has a smaller risk for bending. Another object of the present invention is to increase the slit to any emergency bearings. A further object of the present invention is to remove all bearings or magnets from the high vacuum volumes of the pump. Yet another object of the present invention is to avoid resulting permanent axial pressure difference forces during normal operation. One more object is to provide a vacuum pump which is easily serviceable.

The above object are achieved by a high velocity vacuum pump exhibiting the characteristics described in the claims. A preferred embodiment of a vacuum pump according to the present invention consists of a double acting pump, comprising a rotatable cylindrical portion, an outer stator portion surrounding the cylinder and an inner stator shaft, which is provided within the rotatable cylinder shaped portion. With double acting pump is understood a pump, which has parallelly operating pumping steps between the middle of the shaft of the pump and its ends, i.e. a pump which pumps from the middle portion of the shaft to its both ends or the opposite. A double acting vacuum pump according to the invention provides pumping steps, one first pumping step between the inner shaft of the stator and the rotatable cylinder shaped portion and a second pumping step between the outer stator portion and the rotatable cylinder shaped portion. The different pumping steps can be designed according to similar or different principles for high velocity vacuum pumps.

The suspension of the rotor of the pump is according to the invention operating according to the electrodynamic repulsion principle, where a rotor of an electrically conductive material rotates relative to a stator, comprising magnets, which give rise to a rotationally symmetric magnetic field in all points where the rotor passes. A magnetic field constituted in this way has the property that for an arbitrary, at the rotor existent, passing volume segment do not appear to have any alternating field component. Thus, since the normal component of such a field do not generate any eddy currents, this does not have to be zero, as opposed to what is valid for "the null flux scheme". Accordingly, the electrically conductive material does not have to be infinitely thin, and furthermore it does not need to be positioned exactly in respect of the magnets. Thus, the bearing is not sensitive for thermoexpansion.

DESCRIPTION OF THE DRAWINGS

The invention is explained further by description of exemplifying embodiments with guidance by drawings, in which.

ILLUSTRATIVE EMBODIMENTS

Following, a number of embodiments of the present invention will be described by different exemplifying embodiments. However, it will be understood by someone skilled in the art that other variations falling within the scope of the present claims are possible.

Figure 1:
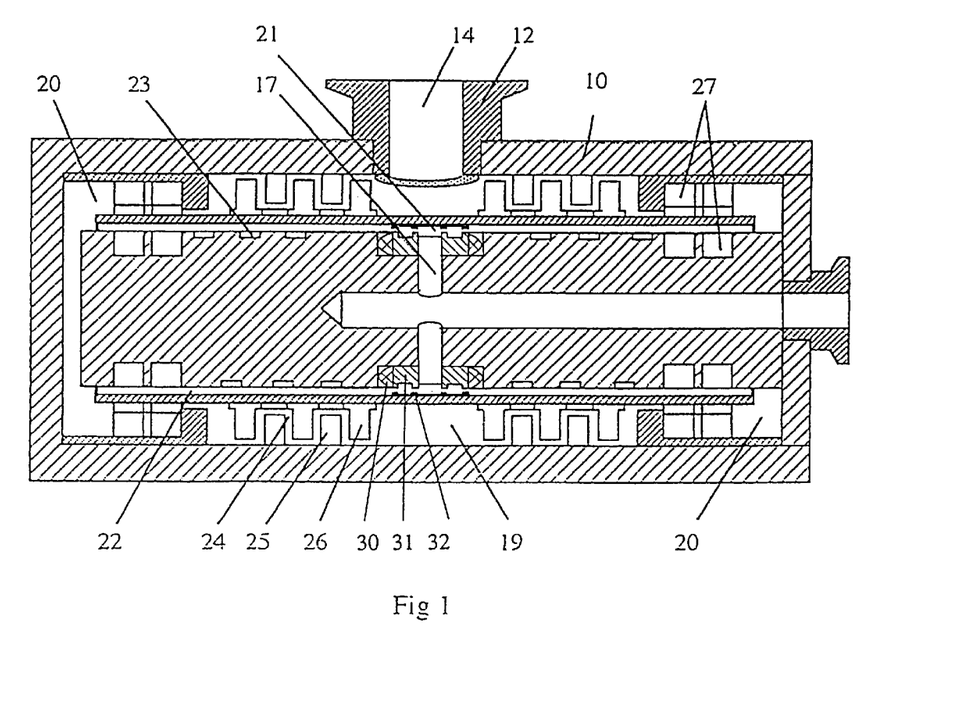
FIG. 1 shows a simplified sectional view of an embodiment of an high velocity vacuum pump according to the present invention.
Figure 2:
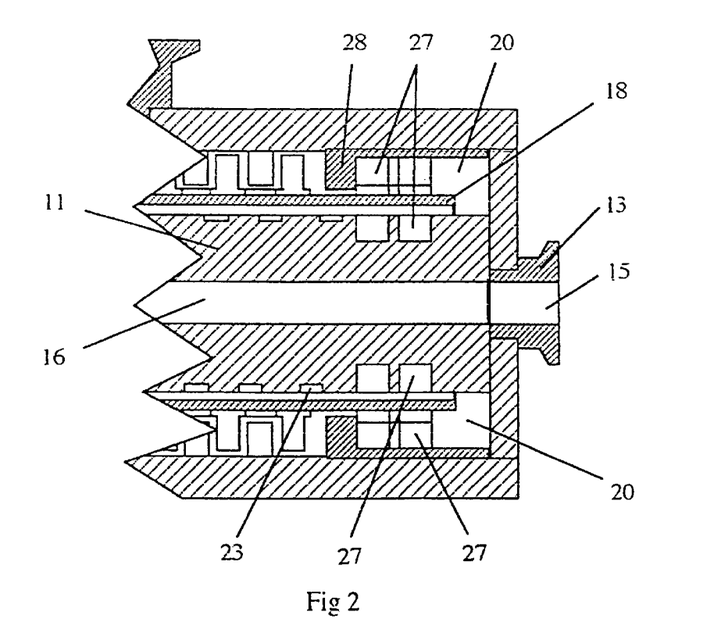
FIG. 2 shows a part of the embodiment shown in FIG. 1.

In FIG. 1, an embodiment of a high velocity vacuum pump according to the present invention is shown. A pump housing comprises an outer stationary casing 10, which hereafter is referred to as outer stator portion, and which encloses the operational pump parts. The stationary part of the pump further comprises en inner stator shaft, which among other things comprises an inverted motor (which is described separately below) and is firmly fitted at one end of the outer stator portion. The outer stator portion 10 further comprises two flanges, one high vacuum flange 12, fitted at the middle of the outer stator portion, and a forevacuum flange 13, fitted at one of the short sides of the pump housing. Through openings 14, 15 in these flanges, the interior of the pump is in contact with the volume which is to be pumped and a forevacuum pump, respectively. An axial channel 16 extends axially from the opening 15 of the forevacuum flange 13 through the inner stator shaft 11, to a position in the middle of the pump housing. One or more radial channels 17 extend radially from this mid position to the surface of the stator shaft 11 and opens into the interior of the pump.

Here, a rotor 18 is formed by a rotatable cylindrical tube of an electrically conductive material. The rotor 18 is provided around the inner stator shaft 11. The stator portions 10, 11 and the rotor 18 defines a number of different volumes within the pump. A high vacuum volume 19 is formed at the middle of the pump outside the rotor 18 and is in direct contact with the opening 14 in the high vacuum flange 12. An intermediate vacuum volume 20 is formed at both ends of the rotor and forms the only connection between the volumes outside and inside of the rotor 18. A forevacuum volume 21 is formed at the middle of the pump inside the rotor 18 and is in direct contact with the radial channels 17.

Between the forevacuum volume 21 and the intermediate vacuum volume 20 is a first pumping step 22. In the sketched embodiment, this first pumping step is constituted by a drag pump, whereby the rotating pump brings the gas particles with it into a number of helical grooves 23. These helical grooves 23 are rotated in opposite directions at the different sides of the forevacuum volume 21, so as to each one for a pre-determined rotational direction of the rotor 18 is acting pumping towards the middle, i.e. from the respective intermediate vacuum volume 20 towards the forevacuum volume 21. The slit between the rotor 18 and the stator shaft 11 is made very narrow so as to prevent backstreaming of gas particles. The detail designs of the slit and the grooves are known as such by the state of the art, why this is not further described in this application.

Between the high vacuum volume 19 and the intermediate vacuum volume 20 is a second pumping step 24. In the sketched embodiment, this second pumping step 24 is constituted by a turbomolecular pump. A number of sets of stationary turbine blades 25 are provided at the outer stator portion 10 and a number of sets of rotating turbine blades 26 are provided at the rotor between the sets of stationary turbine blades 25. The turbine blades 25, 26 are slanted in opposite directions on the different sides of the high vacuum volume 19, so as to each one for the predetermined rotational direction of the rotor 18 is acting pumping outwards from the centre, i.e. from the high vacuum volume 19 towards the respective intermediate vacuum volumes 20. The detail design of the turbine blades are known as such by the state of the art, why this is not further described in this application.

The basic operation of the vacuum pump according to the present invention is evident from the following description. A fore vacuum pump (not shown) is connected to the forevacuum flange 13 and the high vacuum flange is connected to the volume to be pumped. The fore vacuum pump achieves a suitable forevacuum in the pump and in particular at the forevacuum volume 21. When the rotor is brought to rotation with a high speed, the first pumping step 22 starts to act pumping. This conveys the gas particles from the intermediate vacuum volumes 20 to the forevacuum volume 21, where the forevacuum pump maintains the pressure. A drag pump has a relatively high compression ratio and may accordingly achieve a relatively good vacuum in the intermediate vacuum volumes 20. When the rotor 18 rotates, also the second pumping step 24 will act pumping. The rotor blades 25, 26 gives the remaining gas particles an average velocity vector oriented axially, outwards from the centre of the pump, and pump, thereby, the gas particles from the high vacuum volume 19 to the intermediate vacuum volumes 20. Also a turbomolecular pump presents a relatively high compression ratio and the combined effect of the two pumping steps 22, 24 gives an efficient high vacuum pump.

Each pumping step constitutes as such a so called double acting pump. A double acting pump is defined as two at the same shaft provided, parallel acting mirror symmetric pumps. One such pump normally operates to pump either out from or inwards to the centre of the shaft. In the preferred embodiment in FIG. 1, the first step 22 of the double acting pump operates inwards to the centre, while the second operates out from the centre. A double acting pump has the advantage that the axial pressure difference and pumping forces compensate since two in principle parallel acting pumps pump on each side. This means that even if the gas load in the pump varies quite substantially, the shaft will not be exposed to any resulting forces, but the crucial criterion for which gas loads that can be handled is given by how the turbine blades 25, 26 are designed. Any axial bearings do not need to suspend any static load, but need only to be designed to withstand any distorted gas loads or other minor displacements of the shaft in axial direction. Such axial bearings may therefore be designed very simple, and bearings according to the state of the art may preferably be used. These bearings may preferably be placed in the intermediate vacuum volumes 20 at both ends of the rotor 18, or in the fore vacuum volume adjacent of the radial channels 17.

Since both the outside and the inside of the rotor 18 is used to obtain a pumping action, the pump can be made very compact. The length of the rotor 18 can be made much shorter than for a pump according to the state of the art with corresponding pumping efficiency. Since the rotor 18 furthermore is tube shaped, the mass of the rotating body can be reduced significantly. This implies many advantages. The reduction of the length of the rotor implies that the critical number of revolutions occurs at an even higher number of revolutions. The pump may therefore be used at a higher rotational speed, which in turn gives an enhanced pumping efficiency. The reduced mass makes the rotor 18 light, why less energy is required to accelerate the rotor 18 to high rotational speed. Furthermore, the reduced mass contributes to that the rotor 18 is exposed to less bending moments, which together with the reduced length implies that the bending loads on the rotor decrease.

Radial bearings 27 is in the preferred embodiment comprised near the ends of the rotor 18 at both the stator shaft 11 and the outer stator portion 10. These bearings are contact free bearings of a magnetic type and will be described in more detail below. Two emergency bearings 28 are provided in connection to the radial bearings 27, and operates as sliding bearings relative to the outer surface of the rotor at a stationary rotor or at strokes which the magnetic bearings can not parry. Since both the radial bearings 27 and the emergency bearings 28 are provided adjacent to each other in the intermediate vacuum volumes 20, it is enough to make the slit between the emergency bearings and the rotor insignificantly less than the smallest slit in any of the pumping steps. Thus, with this set-up, a larger slit may be used between the emergency bearing and the rotor 18 than what can be achieved according to the state of the art, and the accuracy in mounting of the rotor and emergency bearings does not have to be equally high.

An obvious advantage with the above described embodiment is that no suspension takes place within the high vacuum volume 19, but all bearings are placed in the intermediate vacuum volumes 20 or in the forevacuum volume 21, for which reason the problems with degassing or the like from the suspension parts are not equally critical. Since at least the second pumping step 24 is positioned between the bearings and the high vacuum volume 19, a higher degassing rate from the used components can be accepted.

Figure 3:
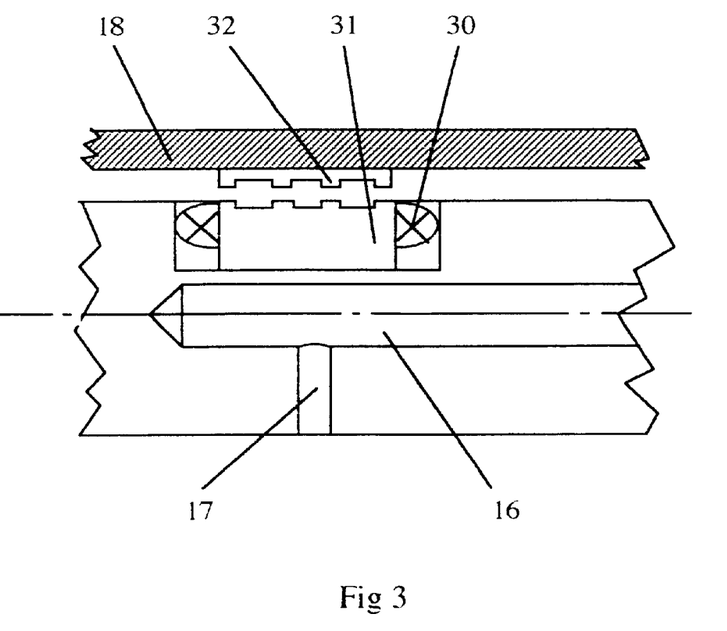
FIG. 3 shows a schematic sketch of the principle for an axial bearing in a preferred embodiment of an high velocity vacuum pump according to the present invention, here in combination with motor motion.

FIG. 3 shows an embodiment of a motor for the pump shown in FIG. 1. Thus, FIG. 3 constitutes a detail section of FIG. 1, where some details concerning the design of the motor (which are not shown in FIG. 1) are shown. This embodiment of the motor is designed as a combined axial bearing, relieving device and synchronous motor. The motor comprises a motor winding 30, which is provided around an iron core 31. In this way, a magnetic field is generated through the iron core. On the inside of the rotor 18 a diametrically magnetised motor magnet 32 is provided, which is turned into a cogged surface towards the motor. The magnet field from the motor winding 30 and the iron core 31 influences the motor magnet 32 so that an axial rigidness is achieved.

The motor can also be used without magnet and operates then as asynchronous motor, but without axial stability.

Figure 4:
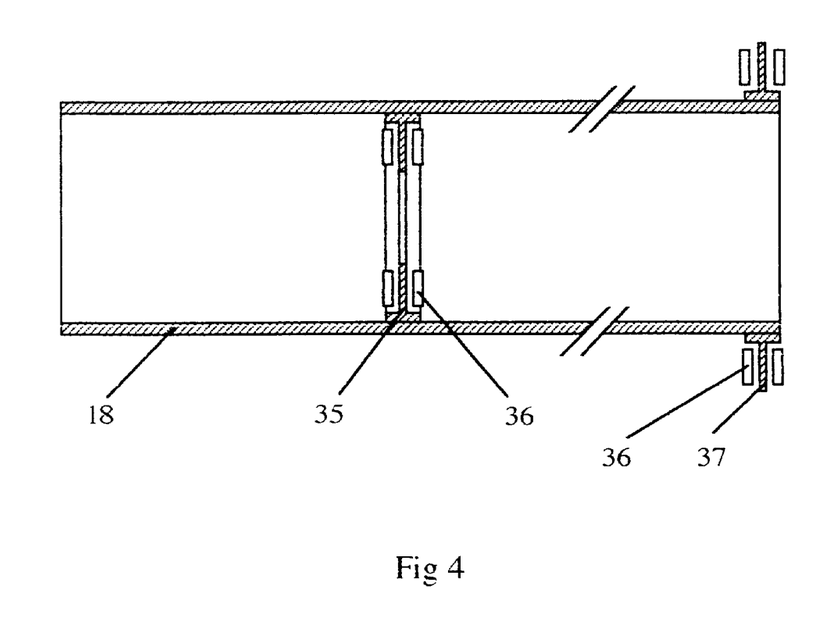
FIG. 4 shows a schematic sketch of another axial bearing in another embodiment of an high velocity vacuum pump according to the present invention.

There are many possibilities for the axial suspension of the rotor. An embodiment for the axial bearing is shown in FIG. 4. A circular inner flange 35 comprises a base ring attached at the rotor 18 and a plane annular disk, in one piece. At each side of the inner flange 35 are circular sectors of permanent magnets 36 firmly provided at the stator (not shown). The inner flange 35 and the magnets 36 together constitute a magnetic bearing of the type described in the Swedish patent application 9203090-7. This type of bearings can preferably be used together with a vacuum pump according to the present invention. In a similar manner, an outer flange 37 comprises a base ring attached at the rotor 18 and a plane annular disc, in one piece. At each side of the outer flange 37, circular sectors of permanent magnets are firmly provided at the stator (not shown). These axial bearings may be used each one separately or together.

In the following, the principle for the radial bearings will be described. This is performed by referring to the FIGS. 5 and 6.

Figure 5:
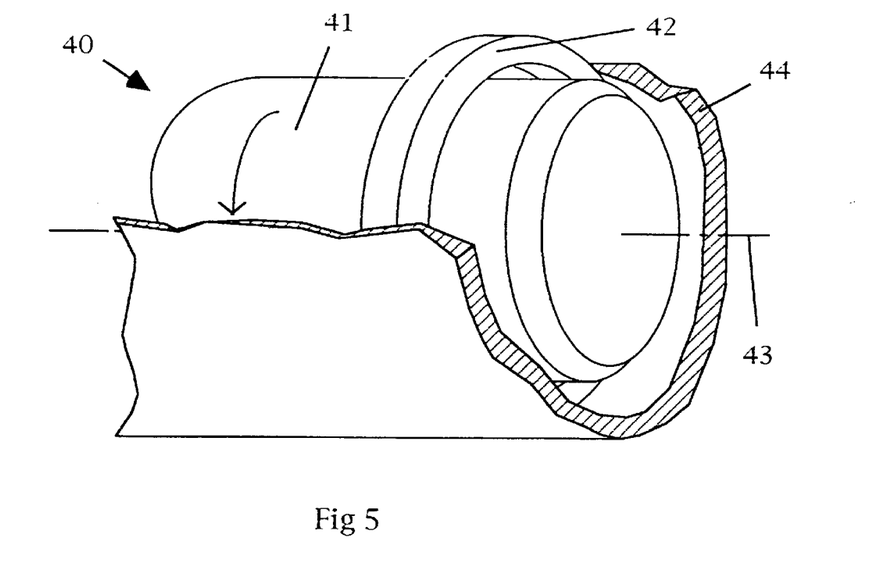
FIG. 5 shows a schematic sketch of a radial bearing, which is usable in an high velocity vacuum pump according to the present invention.

In FIG. 5, a sketch of a bearing which can be used in an high velocity vacuum pump according to the present invention. Some parts are excluded and/or simplified so as to expose the essential parts of the embodiment. A rotor 40 comprising an electrically conductive unmagnetic rotational body 41 is rotatable within an annular magnet 42. The rotational body 41 does not need to be rotationally symmetric as such, but is preferably carefully balanced with respect to a rotation around a fictitious rotational axis 43. The annular magnet 42 is designed to give rise to a rotationally homogeneous magnetic field. By rotationally homogeneous should be understood such a field which does not appear to have any alternating field component for an arbitrary, at the rotational body 11 existent, passing volume segment, when the symmetry axis of the magnetic field coincides with the rotational axis 43 of the rotational body. The annular magnet 42 may be comprised by permanent magnets, magnets of an electromagnetic character, such as superconductors, or a combination thereof. The annular magnet is provided at a stator 44, which in FIG. 5 partially is cut away.

By the above described embodiment, eddy currents will not appear in the rotational body as long as this rotates concentrically with respect of the magnets, since the normal component of such a field does not generate any eddy currents. This is valid even if the rotational body has an extension in radial direction, i.e. has a certain thickness, or if it is exposed to thermoexpansion and thus does not run in the middle of the air gap. In contrary, stabilising currents appears as soon as the rotor is displaced from the centre position and starts to rotate eccentrically.

If the bearing is exposed for a disturbance so that it starts to rotate excentrically, the above mentioned volume unit experiences an alternating magnetic field and in the rotational body 41 centering eddy currents appears, which bring the rotor back to its original position. This is possible since the field has a gradient, i.e. is decreasing, in radial direction, as viewed from the centre of the magnet.

Figure 6:
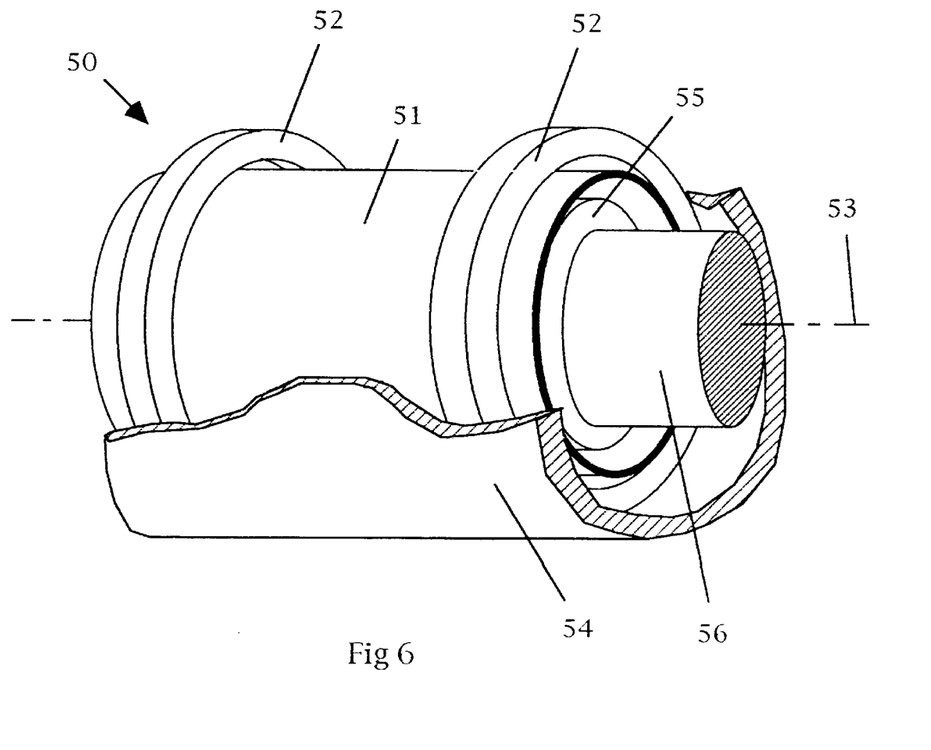
FIG. 6 shows a schematic sketch of another radial bearing, which is usable in an high velocity vacuum pump according to the present invention.

In FIG. 6, another bearing which can be used in a high velocity vacuum pump according to the present invention is shown. This magnet bearing comprises, in a similar manner to the previous case, a rotor 50, which comprises an electrically conductive unmagnetic rotational body 51, which is rotatable within a first annular magnet 52 at each end of the rotational body 51 and which has a fictitious rotational axis 53. The rotor is in this embodiment tubular and encloses radially a stationary axis 56. A second annular magnet 55 is provided at each end of the stationary axis 56, which in turn constitutes a part of a stator 54. The annular magnets 52, 55 are designed in the same manner as was described above. The design can be made very light, and at the same rigid, which results in that it can be used at very high rotational speeds.

An annular magnet can have its magnetic dipole directed in two principally different directions. If the magnetic dipole moment is directed parallel to the rotation symmetry axis of the annular magnet, the magnet is described as magnetically axial oriented, while a magnet whose magnetic dipole moment is directed perpendicular to the rotation symmetry axis of the annular magnet is described as magnetically radial oriented.

By placing two magnetically axial oriented annular magnets concentrically in the same plane, with the dipoles directed in the same directions, it is possible to enhance the magnetic gradient formed in the slit between the annular magnets. In a corresponding way, two magnetically radial oriented annular magnets may be placed concentrically in the same plane, with the dipoles directed in opposite direction, and thereby give rise to an enhanced magnetic gradient. Since the rotor rotates in the slit between the magnets, the radial magnetic field component experienced by the rotational body is thus enhanced, while the tangential remains zero, under presumption that the rotational axis of the rotor coincides with the symmetry axis of the magnets. By any disturbance, i.e. displacement of the rotational axis of the rotational body, the restoring force generated by the induced eddy currents will be stronger than in the case of one single annular magnet. Thereby, a more rigid resilience is achieved.

Another way to enhance the restoring force is to create a large radial magnetic field component along a wider section along the rotational body. This may be done by, instead of positioning additional annular magnets radially with respect to the first one, placing them axially with respect to the first one. To maximise the magnitude of radial gradient, the annular magnets should be placed with alternating directed polarities. This is valid both for magnetically axial oriented and magnetically radial oriented annular magnets.

Obviously, a preferred embodiment comprises a combination of the two above described ways to enhance the magnetic action. Such an embodiment is indicated in FIG. 1. By having two concentrically provided sets of alternating directed annular magnets, which give rise to an intermediate slit, in which the rotor is able to rotate, the magnetic effect can be multiplied.

The above defined annular magnets may of course be replaced by magnets with other rotation symmetric geometries.

The magnets may be constituted by different magnet types, or combinations thereof. A permanent magnet is a simple solution at high speeds, where the high speeds give rise to strong restoring forces. The permanent magnets operates poorer at low speeds or when standing still. By the same reason are electromagnets fed by direct current superb at high rotational speed, while at low rotational speed high currents are needed to give rise to sufficient strong restoring forces. Superconducting magnets may preferably be used. A solution at low rotational speed is to use electromagnets fed with alternating current, which even may cope with a floating contact free suspension for a stationary rotor. However, electromagnets fed by alternating current are less stable at high rotational speed. A preferred embodiment comprises the combination of a permanent magnet and an electromagnet fed by alternating current, whereby a stable suspension for all rotational speeds easily is obtainable.

The electromagnets have the advantage that it is possible to vary its strength during operation and accordingly adapt the properties of the magnet bearing. The rigidness of the bearing, i.e. how large force a displacement from the ideal path is prevented with, is easily set, e.g. depending on the speed by which the rotor rotates. When using a combination of static and fluctuating magnet fields, the mutual relative strength between these two types may preferably be changed. By acceleration of a rotor from stationary conditions to a high rotational speed, it is preferable if the alternating field initially dominates, at the low rotational speeds, whereupon the static field takes over as the rotor accelerates. This can be realised by controlling the currents and/or frequencies for the currents which are sent through the electromagnets.

Figure 7:
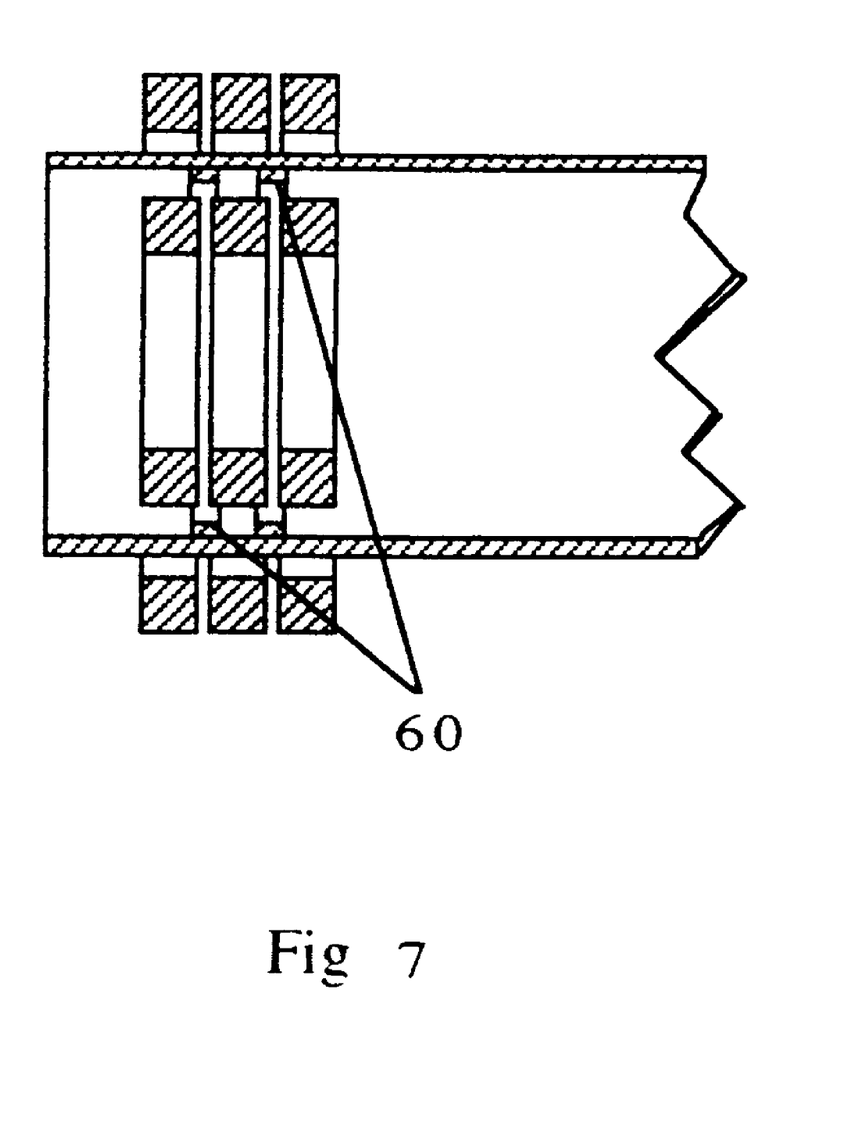
FIG. 7 shows a schematic sketch of a bearing, which is usable as both radial and axial bearing in an high velocity vacuum pump according to the present invention.

Another possibility for axial bearing is shown in FIG. 7. In this embodiment, a rotor is suspended radially by three outer and three inner annular magnets according to above discussed embodiments. At the rotor, also two iron rings 60 are provided along the rotational axis flush with the space between the three annular magnet pairs. However, these iron rings 60 will reduce the radial suspension, but at an axial displacement of the rotor, the change in the magnetic flux will tend to restore the rotor to the original position. The iron rings 60 may either be placed inside the rotor, or outside the same.

Since the suspension features are not fully developed at low rotational speeds, they can either be enhanced by making the wall of tubular shaft thicker or supplemented with some kind of start-up bearing.

The simplest form of start-up bearing would be to cover magnets and may be the shaft with a thin material exhibiting good sliding properties, e.g. Teflon. At start-up, the shaft slides at the sliding surface until the speed is enough high that the shaft lifts and stabilises by the magnet field.

Instead of sliding bearings, ball bearings may of course be used, which then is given a diameter which is slightly larger than the present shaft. The method is common as so called emergency bearings for active magnet bearings.

Air bearings is a better method. In this method, during the start-up phase, air is pumped through small holes drilled between the magnets along the length of the shaft, where a suspending air cushion is created.

The best start-up method is to use an alternative magnet bearing of simplest kind. This bearing does only need to operate axially, but may be designed so as to give a passive radial stability. The bearing does not need to operate at high rotational speed, why the electronics can be manufactured considerably cheaper than for conventional active magnet bearings. At high rotational speed, the electromagnet and its control system may be disconnected.

If the electromagnet is not disconnected at high rotational speed, it may be used for measuring and/or compensation of mechanical forces at the rotor, e.g. if one chooses not to manufacture the pump double acting.

It is obvious for someone skilled in the art that many modifications or alternative solutions in the above disclosed embodiment can be made. Since the described preferred embodiment only constitutes an example, no limitations should be understood from this. It is for instance obvious that the same pumping technique can be used in the two pumping steps 22, 24. Thus it is possible to arrange also the second pumping step as a drag pump. The suspension of the pump can also be performed in many different ways. The preferred embodiment makes use of magnetic bearings both axially and radially, but other types of bearings according to the state of the art are possible.

One can also imagine embodiments where the pumping directions is reversed, i.e. from the inside and outwards. In such a case, the motor arrangement should be moved from the by such means created high vacuum area to limit the degassing effects or similar.

I claim:

1. A pump having a tubular rotor (18,51) supported by at least one magnetic bearing, comprising:
    a stator having an outer stator portion (10,54) and an inner stator shaft (11,56), the tubular rotor being supported concentrically about said inner stator shaft;
    a motor (30,31,32) for rotating said tubular rotor relative to said inner stator shaft (11,56) and said outer stator portion (10,54),
    a first pumping step (22) comprising two parallel but oppositely acting pumping portions, formed between said inner stator shaft (11,56) and said tubular rotor (18,51), and
    a second pumping step (24) comprising two parallel but oppositely acting pumping portions, formed between said outer stator portion (10,54) and said tubular rotor (18,51).

2. The pump of claim 1, wherein the pumping portions of the second pumping step (24) are accessible through an opening (14) provided in a longitudinal center of the outer stator portion;

the pumping portions of the first pumping step (22) are accessible through openings (17) provided in a longitudinal center of the inner stator portion, the first pumping step (22) is effected in opposite directions towards a longitudinal center of the pump, and the second pumping step (24) is effected in opposite directions from the longitudinal center of the pump.

3. The pump of claim 1, wherein the pumping portions of the first pumping step comprise drag pumps including helical grooves (23) formed on the inner stator shaft, and the pumping portions of the second pumping step comprise turbo molecular pumps including turbine blades (26) rotating with the rotor, said pumping portions of the first and second pumping steps being operative to provide a high velocity vacuum pump.

4. A pump having a tubular rotor (18,51) supported by at least one magnetic bearing, comprising:

a stator having an outer stator portion (10,54) and an inner stator shaft (11,56), the tubular rotor being supported concentrically about said inner stator shaft;

a motor (30,31,32) for rotating said tubular rotor relative to said inner stator shaft (11,56) and said outer stator portion (10,54), a first pumping step (22) comprising two parallel but oppositely acting pumping portions, formed between said inner stator shaft (11,56) and said tubular rotor (18,51), and a second pumping step (24) comprising two parallel but oppositely acting pumping portions, formed between said outer stator portion (10,54) and said tubular rotor (18,51), said tubular rotor (18,51) being formed from an electrically conductive and non-magnetic material; and a radial bearing comprising:

a rotationally symmetric magnet arranged on the inner stator shaft, concentrically about a central axis of said stator;

the dipoles of said magnet, at any radius, having the same polarity about the whole periphery of the magnet, a rotationally symmetric magnetic field being provided concentrically about the central axis, so that eddy currents are induced in the tubular rotor of said electrically conductive and non-magnetic material only when said tubular rotor tends to rotate eccentrically about the central axis of the stator.

5. A pump having a tubular rotor (18,51) supported by at least one magnetic bearing, comprising:

a stator having an outer stator portion (10,54) and an inner stator shaft (11,56), the tubular rotor being supported concentrically about said inner stator shaft;

a motor (30,31,32) for rotating said tubular rotor relative to said inner stator shaft (11,56) and said outer stator portion (10,54), a first pumping step (22) comprising two parallel but oppositely acting pumping portions, formed between said inner stator shaft (11,56) and said tubular rotor (18,51), and a second pumping step (24) comprising two parallel but oppositely acting pumping portions, formed between said outer stator portion (10,54) and said tubular rotor (18,51), said tubular rotor (18,51) being formed from an electrically conductive and non-magnetic material; and a radial bearing comprising:

an annular, rotationally symmetric first magnet arranged on the outer stator portion;

an annular, rotationally symmetric second magnet arranged on the inner stator shaft;

the first and second magnets being concentrically disposed relative to a central axis (43,53) of the inner stator shaft, forming a gap between the first and second magnets where the tubular rotor is allowed to rotate, stabilizing eddy currents being induced in the electrically conductive and non-magnetic material of the tubular rotor only when the tubular rotor tends to rotate eccentrically about the central axis.

6. The pump of claim 5, wherein the first and second magnets are magnetically axial oriented in the same direction of polarity.

7. The pump of claim 5, wherein the first and second magnets are magnetically radial oriented in opposite directions of polarity.

8. The pump of claim 5, wherein at least two sets (27) of the first and second magnets are disposed in an axial direction of the pump, the sets of magnets having alternately directed polarities.

9. The pump of claim 5, wherein the motor (30,31,32) is a synchronous motor formed by a motor winding (30) and an iron core (31), arranged on the inner stator shaft, and a magnetized motor magnet (32), arranged on the rotor.

* * * * *